US012692076B2

(12) United States Patent
Warrier et al.

(10) Patent No.: US 12,692,076 B2
(45) Date of Patent: Jul. 28, 2026

(54) SYSTEM AND A METHOD FOR HANDLING INVENTORY IN A NANO ROBOTIC FULFILLMENT CENTER OR A ROBOTIC DARK STORE

(71) Applicant: Amazon Technologies, Inc., Seattle, WA (US)

(72) Inventors: Abhinav Warrier, Maharashtra (IN); Anurag Dutta, New Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 478 days.

(21) Appl. No.: 18/120,755

(22) Filed: Mar. 13, 2023

(65) Prior Publication Data

US 2023/0286749 A1     Sep. 14, 2023

Related U.S. Application Data

(60) Provisional application No. 63/319,573, filed on Mar. 14, 2022.

(51) Int. Cl.
| | |
|---|---|
| *B65G 1/10* | (2006.01) |
| *B65G 1/137* | (2006.01) |
| *G06Q 10/087* | (2023.01) |
| *G06Q 30/02* | (2023.01) |

(52) U.S. Cl.
CPC ......... B65G 1/1373 (2013.01); G06Q 10/087 (2013.01); G06Q 30/02 (2013.01)

(58) Field of Classification Search
CPC ...... B65G 1/1373; B65G 1/10; B65G 1/1375; B65G 1/1378; G06Q 10/087; G06Q 30/02
See application file for complete search history.

(56) References Cited

U.S. PATENT DOCUMENTS

| | | | | |
|---|---|---|---|---|
| 9,501,755 | B1 * | 11/2016 | Palamarchuk ... | G06Q 10/08355 |
| 10,026,044 | B1 * | 7/2018 | Wurman ................ | G06Q 10/08 |
| 10,692,041 | B1 * | 6/2020 | Mendola .............. | B65G 1/0492 |
| 2013/0103552 | A1 * | 4/2013 | Hoffman .............. | G06Q 10/047 |
| | | | | 705/28 |

(Continued)

FOREIGN PATENT DOCUMENTS

| | | | | | |
|---|---|---|---|---|---|
| CN | 1009153 | B | * | 8/1990 | .............. A47F 5/05 |
| CN | 210213653 | U | * | 3/2020 | |

*Primary Examiner* — Justin Holmes
(74) *Attorney, Agent, or Firm* — Eversheds Sutherland (US) LLP

(57) ABSTRACT

Present disclosure relates to a system and a method for fulfilling an order in a facility, like a nano robotic fulfillment center or a robotic dark store. The system includes a plurality of inventory holders, each adapted to receive and store inventory. Each of the plurality of inventory holders is configured to be docked to a mobile drive unit, wherein the mobile drive unit is configured to transport the inventory holder to one or more stations in the facility. Further, each inventory holder comprises a plurality of circular compartments supported by a rotatable shaft, each compartment structured to support one or more inventory items of the plurality of inventory items. Each of the plurality of inventory holders comprises one or more wheels structured to support the inventory holder during transportation between the stations in the facility by the mobile drive unit.

13 Claims, 12 Drawing Sheets

(56)          References Cited

U.S. PATENT DOCUMENTS

| | | | |
|---|---|---|---|
| 2013/0186124 A1* | 7/2013 | Wiklinski | G07F 9/105 |
| | | | 62/465 |
| 2017/0330269 A1* | 11/2017 | Kanellos | G06Q 10/087 |
| 2019/0233212 A1* | 8/2019 | Mountz | B65G 1/137 |

* cited by examiner

SYSTEM AND A METHOD FOR HANDLING INVENTORY IN A NANO ROBOTIC FULFILLMENT CENTER OR A ROBOTIC DARK STORE

CROSS-REFERENCE TO RELATED APPLICATIONS

This application claims the benefit of U.S. Provisional Patent Application No. 63/319,573, filed Mar. 14, 2022, the entirety of which is incorporated herein by reference.

TECHNICAL FIELD

The present disclosure generally relates to warehouse management. Particularly, but not exclusively, the present disclosure relates to robotic devices for automated handling of inventory in a warehouse or a fulfillment center. Further, embodiments of the present disclosure disclose a system and a method for handling inventory in a Nano Robotic fulfillment center.

BACKGROUND

E-commerce, also known as internet commerce or online commerce, is an activity where goods and service transactions are performed over an electronic network. E-commerce activities have been witnessing a drastic surge in the last two or three decades owing to a number of reasons including busy lifestyles, improved accessibility to goods and/or services in a fingertip, quality of services, digitization of payments, quick turnaround times and so on. With the ever-increasing popularity of electronic shopping of goods, the onus on the e-commerce businesses or sectors have increased several folds to fulfil the requirements of the customers. Maintaining consistency with respect to quality of services [for example, delivery of a particular commodity] without compromising with timelines is indeed a colossal challenge for these sectors. Goods based E-commerce sectors generally operate through diversified facilities, known as fulfillment centers (FCs) which may be nano fulfilment centers, micro fulfilment centers, dark stores or warehouses, where the goods undergo a number of processes until they are finally dispatched to the doorsteps of the customers. FCs generally house a large inventory of products, such as grocery items, of differing types, sizes, packaging and other physical characteristics. In response to customers' orders, personnel in the FCs pick and pack the required inventory items into deliverable packages for shipment to the customers.

With the advancement of technology, e-commerce and logistics sectors have seen remarkable growth in the recent past. Micro-Fulfillment Center (MFC) and the Dark Store, which are relatively new concepts in the market, have been gaining a lot of attention as well as investment opportunities. Dark stores and MFCs are enroute to become a retailer's core strategy for solving supply chain vulnerability, especially in the present situation of global pandemic where retailers are becoming more and more reluctant to accept the risk of supply chain disruptions in the face of increasing pressure for on-demand delivery. Dark stores and MFCs play a major role in such scenarios by assisting retailers succeed in quick commerce, also known as Commerce. One can define them as mini logistics hubs strategically located in high-density urban centers where they allow the preparation of orders in a very short period of time. MFCs and dark stores may be differentiated based on the following aspects. MFCs were originally implemented in the Wholesalers & Groceries sector (supermarkets in general), where customers particularly demand instant delivery. However, after noticing the advantages MFCs offered in the wholesale and grocery sectors, they were gradually being adopted and implemented in other industrial sectors. On the other hand, the Dark Stores are also mini urban logistics centers created exclusively for the preparation of orders requested online. The spaces they occupy, unlike Micro-Fulfillment, are larger, even physical retail stores can optimize their spaces by converting part of them into a Dark Store. Dark stores also enable consumers to purchase from retailers without having to enter the store. After placing an order online, a customer can either pick it up by himself or have it shipped. Dark stores do use physical outlets, but these spaces are eCommerce warehouses, distribution centres or micro-fulfillment hubs. Dark stores get their name from being dark—that is, closed to the public, since they are only used to fulfil online orders. More common in the grocery and whole food sectors, dark stores are becoming increasingly prevalent in fashion, big box retail and the homeware and furniture industries.

Inventory handling facilities employ a number of transportation vehicles to transport the goods from one location to another. The vehicles may include manually driven vehicles like forklifts and warehouse utility vehicles, or automated vehicles such as automated guided vehicles, transportation robots and so on. These vehicles may be navigated through the goods storage area to pick up a particular inventory which later on may be transported to a dedicated workstation, for example, sorting stations, packing stations, dispatch sections and so on. The automated and semi-automated vehicles may be confined to move along predefined paths using feedback from a number of sensors interfaced with the vehicle driveline control. The vehicles perform both transfer and transport functions in moving containers of items within a workspace via a network of roadways. Under computer control, the autonomous vehicles transfer and transport case containers of inventory units between incoming receiving stations, intermediate storage locations, and outgoing order-assembly stations where entire containers or individual item units are combined in the outbound container.

Despite having witnessed tremendous technological advancements with respect to handling and fulfilling of customer orders, facilities like nano fulfillment centers or micro fulfillment centers, warehouses or even dark stores face significant challenges in responding to requests for inventory items. With growth and diversification of such facilities, the challenges of simultaneously completing a large number of packings, storing, and other inventory-related tasks becomes more and more complicated. Inventory systems may quite often face hindrances associated with inefficient utilization of system resources, including space, equipment, and manpower, can result in lower throughput, unacceptably long response times, an ever-increasing backlog of unfinished tasks, and, in general, poor system performance. Additionally, expanding or reducing the size or capacities of many inventory systems requires significant changes to existing infrastructure and equipment, thereby lacking flexibility and customizability. As a result, the cost of incremental changes to capacity or functionality may be prohibitively expensive, limiting the ability of the system to accommodate fluctuations in system throughput. Hence, there exists a need for an improved process and system for alleviating one or more problems associated with the state-of-the-art inventory handling methods and systems outlined above.

The information disclosed in this background of the disclosure section is for enhancement of understanding of the general background of the disclosure and should not be taken as an acknowledgement or any form of suggestion that this information forms the prior art already known to a person skilled in the art.

SUMMARY

One or more shortcomings of the conventional inventory handling systems and methods in a facility are overcome, and additional advantages are provided through the present disclosure. Additional features and advantages are realized through the techniques of the present disclosure. Other embodiments and aspects of the disclosure are described in detail herein and are considered a part of the claimed disclosure.

In a non-limiting embodiment of the disclosure, a system for fulfilling an order in a facility is disclosed. The system includes a plurality of inventory holders, each adapted to receive and store a plurality of inventory items. Each of the plurality of inventory holders is configured to be docked to a mobile drive unit, wherein the mobile drive unit is configured to transport the inventory holder to one or more stations in the facility. Further, each inventory holder comprises a plurality of compartments supported by a rotatable shaft, each compartment structured to support one or more inventory items of the plurality of inventory items. Each of the plurality of inventory holders comprises one or more wheels structured to support the inventory holder during transportation between the stations in the facility by the mobile drive unit.

In an embodiment, the plurality of compartments has at least one of circular shape, square shape, rectangular shape or any other geometrical shape.

In an embodiment, each of the plurality of inventory holders includes an adjustable topology structured to adjust at least one of height, width and volume of the inventory holder based on spatial constraints or infrastructure within the facility.

In an embodiment, the facility is at least one of a nano robotic fulfillment center (NRFC), a robotic dark store (RDS), a warehouse, a commercial space, a parking space, a space intended for utility or any vacant space.

In an embodiment, the inventory holder is a rack. Further, each compartment in the inventory holder is separated vertically by a predetermined distance from an adjacent compartment. Each compartment is further separated into two or more sectors by at least one partition extending within the compartment.

In an embodiment, at least one compartment of the plurality of compartments is adapted to accommodate a refrigeration unit and/or a cold storage unit. Further, the refrigeration unit and/or the cold storage unit is interfaced with at least one battery and an inverter unit. In an embodiment, the refrigeration unit and/or the cold storage unit is accommodated at a lowermost compartment of each inventory rack.

In an embodiment, the system includes a conveyor for transporting the inventory from the nano robotic fulfillment center or the robotic dark store to a pick-up location through a pigeonhole rack or a pick-up deck.

In an embodiment, the mobile drive unit is a robotic transport unit. The robotic transport unit comprises electronic circuitry, a docking head, a plurality of drive wheels, and optionally an elevating mechanism.

In an embodiment, the plurality of compartments in the inventory holder is of any geometrical shape. The geometrical shapes include, but are not limited to, one of hexagonal, octagonal, decagonal or any other polygonal shape. Further, each compartment comprises at least one triangular sector, at least one rectangular sector and any other geometrical shaped sector to store the plurality of inventory items.

In an embodiment, the geometrical shape of each of the plurality of compartments and the at least one sector in each of the plurality of compartments is selected based on shape, size or any other physical characteristics of the inventory items being stored.

In another non-limiting embodiment of the disclosure, a method for fulfilling an order in a facility is disclosed. The method includes docking one of a plurality of inventory holders containing a plurality of inventory items by a mobile drive unit based on a command received from a central management system and transporting each of the plurality of inventory holders to one or more stations in the facility by the mobile drive unit. The method then includes navigating a person between one inventory holder and another inventory holder to process the inventory items while each inventory holder remains stationary, and then transporting processed inventory from the fulfillment center to a pick-up location through a pigeonhole rack or a pick-up deck using a conveyor.

In an embodiment, the method includes optimizing placement of each of the plurality of inventory items in the inventory holder based on at least one of sales adjacency and data from sales history. Further, the method includes optimizing and/or organizing placement of each inventory holder of the plurality of inventor holders proximal to each drop zone in the facility based on at least one of sales adjacency and the data from the sales history.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. The same numbers are used throughout the figures to reference features and components. Some embodiments of the device in accordance with embodiments of the present subject matter are now described below, by way of example only, and with reference to the accompanying figures.

Figures 1A, 1B, 1C:
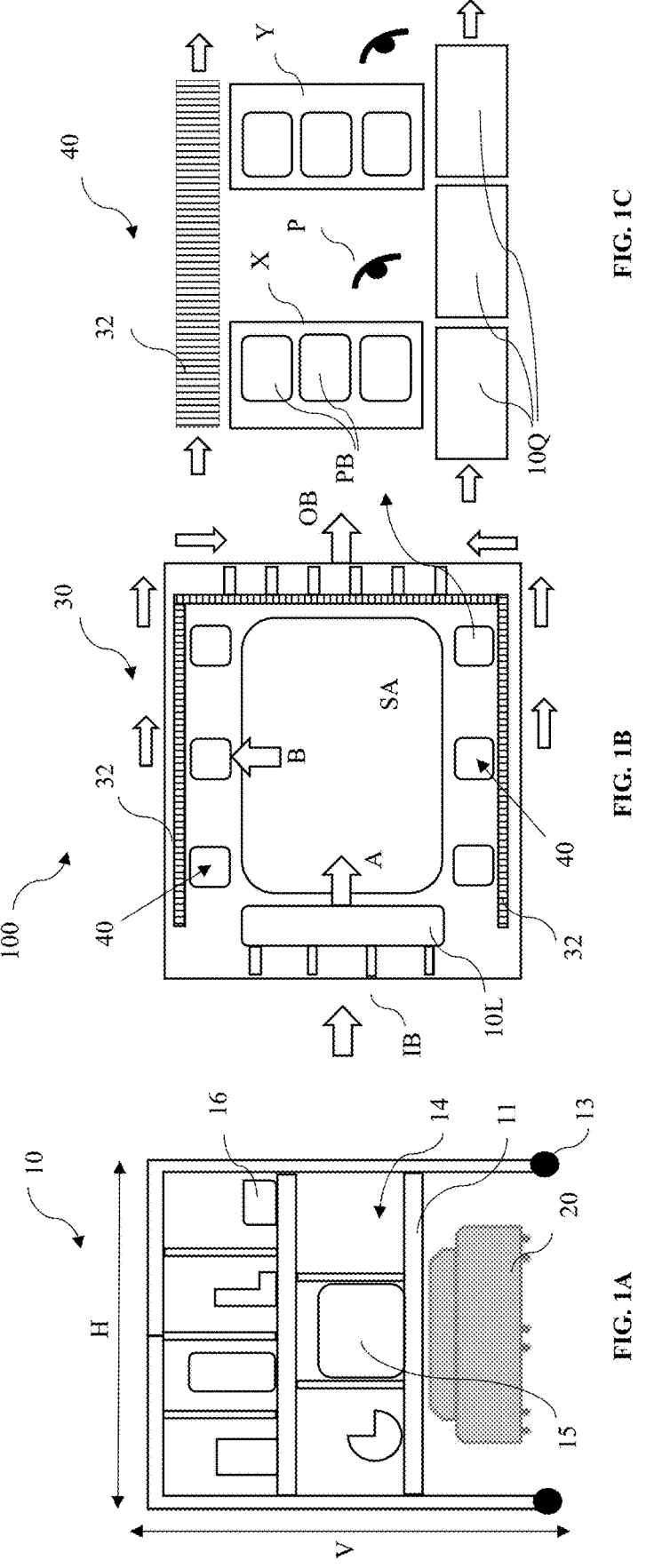
FIG. 1A illustrates schematic front view of an inventory holder supported by a mobile drive unit.
FIG. 1B illustrates schematic top view of a facility and a station within the facility respectively.
FIG. 1C illustrates another schematic top view of a facility and a station within the facility respectively.

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover non-exclusive inclusions, such that a system or a method that comprises a list of components or steps does not include only those components or steps but may include other components or steps not expressly listed or inherent to such system or method. In other words, one or more elements in the system or the method preceded by "comprises . . . a" does not, without more constraints, preclude the existence of other elements or additional elements in the system or method.

In the following description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A illustrates the schematic front view of an inventory holder (10) supported by a mobile drive unit (20). FIG. 1B and FIG. 1C illustrate schematic top views of a facility (30) and a station (40) within the facility (30), respectively. Throughout the disclosure, terms like "station" and "workstation" may be used interchangeably. FIG. 1A, FIG. 1B, and FIG. 1C collectively illustrate a system (100) for fulfilling an order in the facility (30). The term "order" and "processed inventory item" are used interchangeably throughout the specification. The facility (30), as shown in FIG. 1A, FIG. 1B, and FIG. 1C, may incorporate some legacy system features to carry out the operations. The facilities, for the last one or two decades, have been extensively reliant on autonomous devices, automation, artificial intelligence to process goods and provide services owing to a number of benefits. Embodiments of the present disclosure are pertained with the day-to-day transactions carried out in a facility (30), which may include, but not limited to a warehouse, a fulfillment center, a distribution center or any other space which allows transaction of inventory and/or services. In an exemplary configuration as shown in FIG. 1A, one or more inventory items (16) [simply referred to as "items" for simplicity] be stowed or strategically arranged inside compartments or storage shelves (14) of the inventory holder (10). Throughout the disclosure, terms like "storage shelves", "shelves", "shelf" and "compartments" may be used interchangeably. In an embodiment, the inventory holder (10) may be a rack or a multi-compartment cart, and a number of such racks or carts may be queued or arranged in succession. Each shelf (14) may accommodate one or more inventory items (16) depending on the requirement. In an embodiment, the inventory holder (10) may be supported on wheels (13) which may be distributed at the lowermost portion of the inventory holder (10). The wheels (13) may support the inventory holder (10) and may assist in transporting the inventory holder (10) with minimal effort between points, for example, between the stations or from drop zones (DZ) to one or more stations. The inventory holder (10) may be transported by means of a mobile drive unit (20) as shown in FIG. 1A.

The mobile drive unit (20) may be an autonomous vehicle such as a robotic mobile drive unit which may have circuitry and associated controls to receive instructions and transport the inventory holder (10) to an intended point in the facility (30). The inventory holder (10) may be docked or mounted on the mobile drive unit (20) for transportation. The details of the mobile drive unit (20) and the operating characteristics is explained in the forthcoming paragraphs. A facility (30) which employs such robotic mobile drive units is known as a "robotic facility". For example, a facility may be termed as a robotic fulfillment center, a robotic warehouse and so on. When the robotic mobile drive units are employed in fulfillment centers operating on a nano scale, then the fulfillment centers are referred to as "nano robotic fulfillment centers (NRFC)". In an embodiment, the facility (30) is at least one of a nano robotic fulfillment center (NRFC), a robotic dark store (RDS), a warehouse, a commercial space, an unused parking space, an unused urban space apt for e-commerce utility or business, or any vacant space which serves the purpose of carrying out goods distribution on a nano scale. A nano robotic fulfillment center [also known as nano robotic fulfillment warehouse], unlike multimillion square foot warehouses located remotely and distantly from the city centre, are typically located in much-smaller spaces within the cities with average area ranging from about 1,000 sq. feet to about 10,000 sq. feet. In some embodiments, the dimensions of the nano robotic fulfillment center may range beyond 10,000 sq. feet. For example, they may range between 2000-3000 sq. feet with a height varying between 6 feet and 25 feet, or up to 35 feet. Robotic dark stores, similar to NRFCs, employ autonomous systems like robotic mobile drive units (20) to perform fulfillment of online orders. Robotic dark stores are often designed to meet/fulfil online orders of the customers in the shortest time possible. This is the reason why robotic dark stores diversify within the city as physical outlets, eCommerce warehouses, distribution centres or micro-fulfillment hubs. Robotic dark stores, therefore, may employ a large number of smaller capacity robotic systems such as robotic mobile drive units (20) which may navigate faster to meet the timelines. Robotic dark stores are common in the grocery and whole food sectors, robotic dark stores are becoming increasingly prevalent in fashion, big box retail and the homeware, and furniture sectors.

Although in preferred embodiments of the present disclosure, nano scale facilities such as "nano robotic fulfillment centers" are referred often, the same should not be construed as limitation, as the system and the method of the present disclosure may be extended to other scales such as robotic dark stores, micro-FCs or mini scale facilities.

The inventory holder (10), as shown in FIG. 1A, may include a base (11) which may support the lowermost shelves. The underside of the base (11) may be firmly docked or anchored to the mobile drive unit (20) so that the mobile drive unit (20) may carry the inventory holder (10) to an intended point, for example, a station. In an embodiment, the wheels (13) assist in supporting and navigation of the inventory holder (10) during transportation by the mobile drive unit (20). In another embodiment where the wheels (13) are absent, the mobile drive unit (20) may lift the inventory holder (10) to a predefined height and then carry the inventory holder (10). However, absence of wheels (13) like in existing/conventional racks may pose problems such as imbalance of the inventory holder at the time of carrying by mobile drive unit, especially if the inventory holder is taller and loaded with heavier inventory items (16) at the top sections. This problem may be addressed by the wheels (13) provided at the bottom, which not only assist in balancing the inventory holder (10) during transport, but also are beneficial in supporting the inventory holder (10) of variable heights, widths and depths depending on height, width and volume constraints inside the facility (30). Providing wheels (13) may also eliminate the need for lifting the inventory holder (10) from the ground by the mobile drive unit (20). This not only optimizes the space utilization in a facility (30) but also provides customizability/flexibility with respect to topology of the inventory holder (10) to suit the infrastructure of the facility (30). In an embodiment, the inventory holder (10) may be modularly designed, manufactured, and assembled to suit the space constraints and infrastructure within a given facility (30). For example, the compartments in the inventory holder (10) may be quickly assembled or disassembled to add or reduce the height and/or width according to space constraints.

In an embodiment, the inventory holder (10) may be designed and fabricated such that it may accommodate at least one cold storage unit and a refrigeration unit (15) in one or several shelves (14). Throughout the disclosure, "cold storage unit", and "refrigeration unit" may be used interchangeably. The cold storage unit and/or refrigeration unit (15) may be intended to provide a cold or freezing environment to inventory items such as perishable goods, grocery and so on. In an embodiment, the cold storage unit and/or refrigeration unit (15) may be accommodated on the base (11) of the inventory holder (10). In another embodiment, the cold storage unit and/or refrigeration unit (15) may be connected to at least one battery and an inverter for power supply and to ensure uninterrupted operation of the cold storage unit and/or refrigeration unit (15) at the time of navigation within the facility (30). The integration of cold storage unit and/or refrigeration unit (15) with the inventory holder (10) eliminates the need for the requirement of separate cooling units, such as centralized cooling or AC unit. This is beneficial in spaces where installation of centralized cooling/AC units is not possible or feasible, for example, parking spaces.

Reference is now made to FIG. 1B and FIG. 1C to illustrate certain operational aspects in a facility (30) according to some embodiments. FIG. 1B shows a schematic top view of a portion of the facility (30), for instance, a distribution center. The distribution center has one or more drop zones (DZ) through which plurality of inventory holders (10) may be loaded or queued up within a storage area (SA) for providing access to workstations (40). The inventory items (16) may be loaded into the shelves (14) of each inventory holder (10) and may be brought into the drop zone (DZ) based on the sequence of orders received by the customers. Each inventory holder (10L) loaded with inventory items (16) may be transported from path (A) towards one or more stations (40) as indicated by path (B) by the mobile drive unit (20), which may be a robot. In an embodiment, the station may be a picking station where a person may pick desired inventory items and place them in boxes or cartons or baskets. The items placed in boxes or cartons, or baskets may be conveyed via conveyors (32) for further processing, in a direction indicated by arrows. The items coming out of the conveyer (32) may be further transported from an outbound (OB), as shown in FIG. 1B. Now referring to FIG. 1C, a magnified view of a station (40) may be seen. For the purpose of illustration, an exemplary top view of a picking station (40) is considered and described. As shown in FIG. 1B, a number of picking stations (40) may be dispersed linearly along the common conveyor (32). The mobile drive unit (20) may bring the inventory holder (10) to each of these linearly distributed picking stations (40). In an embodiment, a plurality of inventory holders (10) may be lined up or queued up in the vicinity of linearly dispersed picking stations (40), as shown in FIG. 1C. The queued-up inventory holders are represented by the numeral (10Q). For queueing, each of the loaded inventory holders (10L) is transported sequentially by a mobile drive unit (20) from the drop zones (DZ). Once the mobile drive unit (20) brings an inventory holder (10) to a dedicated point, the mobile drive unit (20) may leave the inventory holder (10) at the point and then move on to bring the next inventory holder (10L) from drop zone (DZ) for filling a different order. In an embodiment, the operational embodiment includes optimizing placement of each of the plurality of inventory items (16) in the inventory holder (10) based on at least one of sales adjacency and data from sales history. For instance, a plurality of inventory items which recorded highest sales in a predefined time period, such as the past week, the past month or the past year may be advantageously placed in an inventory holder. Such inventory holders (10) may be transported by the mobile drive units (20) on a continuous and in an optimized manner so that the person (P) in each workstation may pick a number of such inventory items instead of one. This is beneficial in reducing the lead/process time, manpower as well as in improving the process flow in the facility. In an embodiment, the optimization with respect to placement of inventory items (16) based on at least one of sales adjacency and data from sales history may be performed by one or more software models and/or application interfaces. In another embodiment, the operational embodiment may include optimizing and/or organizing placement of each inventory holder of the plurality of inventor holders (10) proximal to each drop zone (DZ) in the facility based on at least one of sales adjacency and the data from the sales history. This may also be performed using one or more software models and/or application interfaces.

Now, when a nano facility (30) is taken into consideration, a person deployed at each station (40) may navigate between different inventory holders (10) to process different inventory items (16), while the mobile drive unit (20) leaves the inventory holder(s) (10) in one place [station] and move on. For example, consider two different picking stations (X) and (Y), and there is one inventory holder (10XY). Suppose if the inventory holder (10XY) is required by both the picking stations (X) and (Y) to fulfil orders, then instead of moving the inventory holder (10XY) between the picking stations (X) and (Y) by the mobile drive unit (20), the persons (P) deployed in the respective stations (X) and (Y) may move to the inventory holder (10XY) stationed at one place to pick all the necessary items. This eliminates the need for mobile drive unit (20) shuttling continuously to and fro the picking stations (X) and (Y) multiple times. This feature is beneficial eliminating complexities involved in toand-fro movement of the mobile drive unit (20) between picking stations, as shuttling the inventory holder (10XY) between multiple picking stations may lead to interference, potential collisions, and require complicated and sophisticated programming of the software, especially when the facility (30) is operating on a nano scale. On the other hand, personnel (P) moving to different inventory holders (10) to pick the items is far less complicated and beneficial in terms of prevention of collisions, interferences, etc. Once the person (P) picks an intended item (16), he/she may place the items in a box, crate, bag, basket (PB), etc., which may be placed on the conveyer for further transport. Once the inventory item (16) has been completely processed after the picking, packing, inspection and other steps, the order is ready for dispatch. In an embodiment, each order ready for dispatch may be conveyed to at least one pigeonhole rack [not shown] through a conveyer [not shown]. The order(s) [processed inventory items] arriving at the pigeonhole rack may be stored in a dedicated hole [pigeonhole], such that the order is accessible to the delivery personnel for shipment or delivery. In an embodiment, conveying each of the plurality of processed inventory items is performed using a drop chute arranged from one or more stations towards the at least one pigeonhole rack. The pigeonhole rack may be placed at the outermost part of the delivery station in a manner similar to drive-thru facilities where food and other commodities are collected while driving/riding a vehicle without having to get down from the vehicle or entering the store. The delivery personnel may pick up the order(s) from each dedicated pigeonhole and immediately move to deliver them without having to leave the vehicle or entering the facility (30).

Figure 2A:
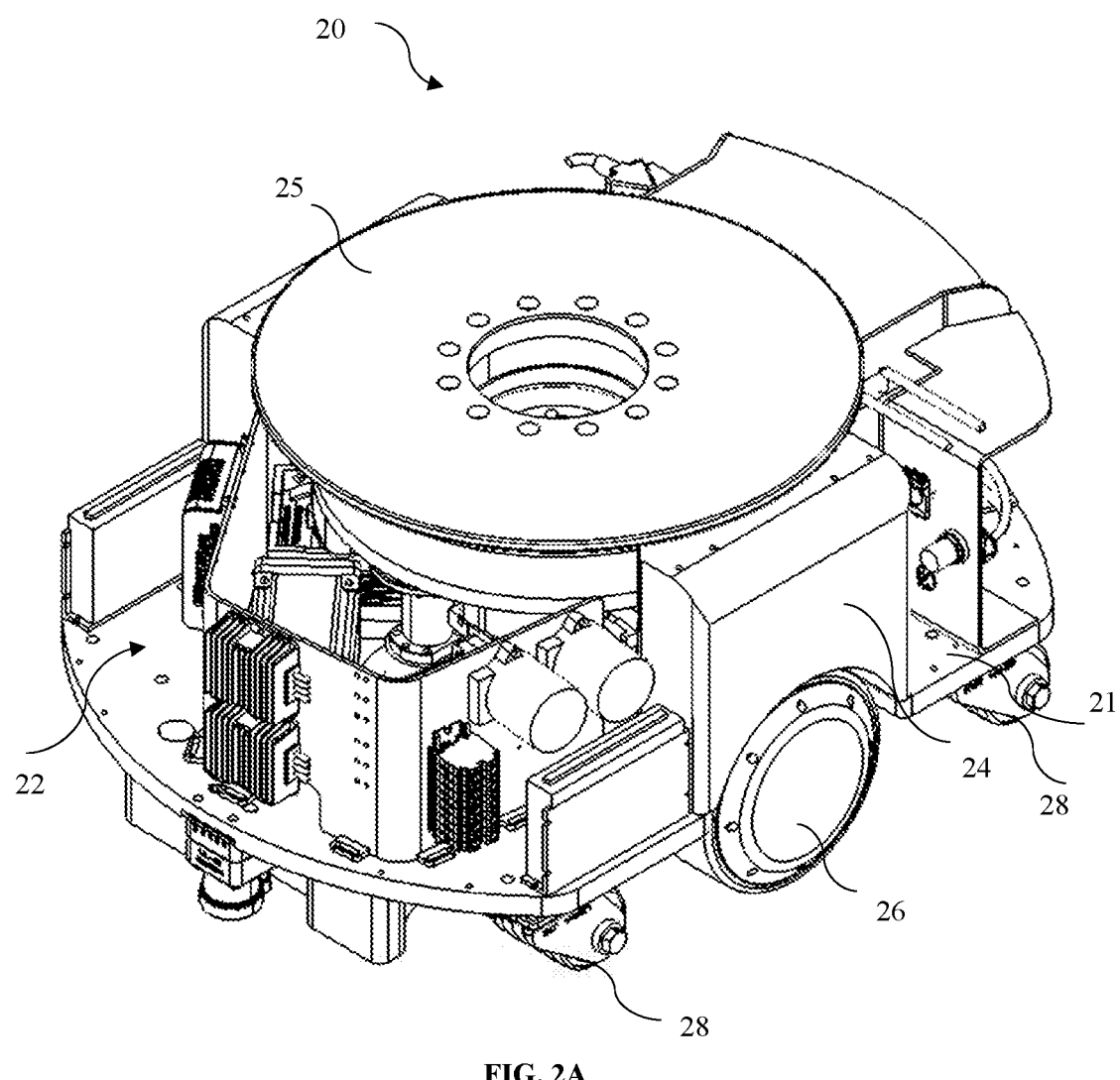
FIG. 2A illustrates perspective view of a section of the mobile drive unit shown in FIG. 1A.
Figure 2B:
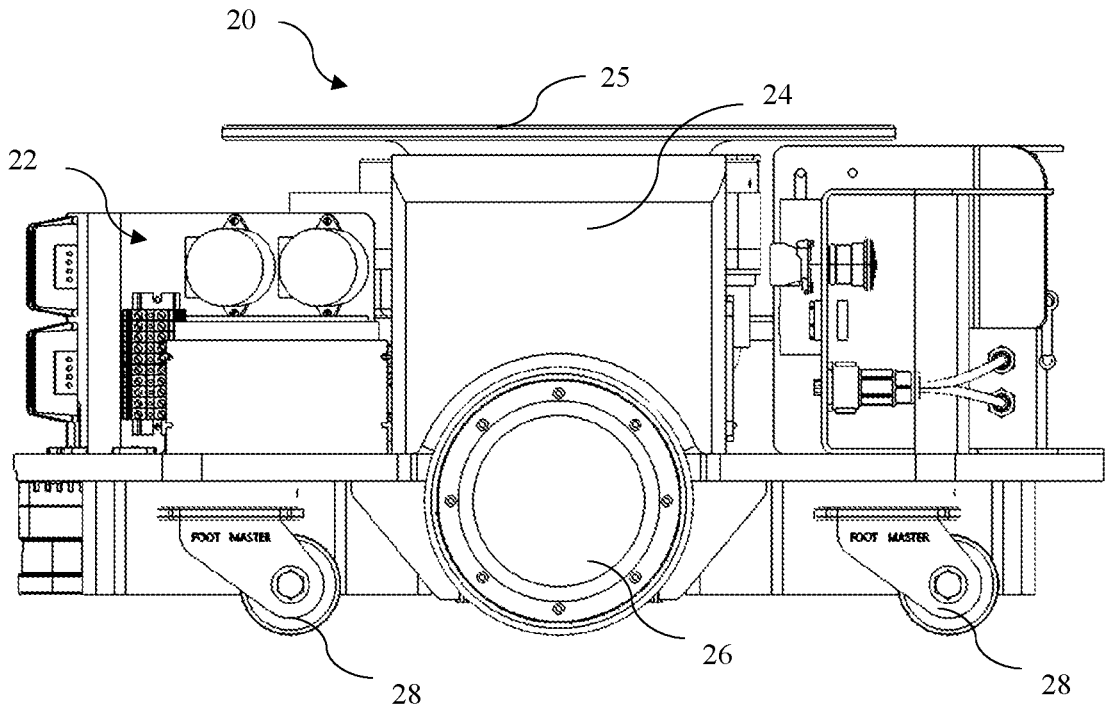
FIG. 2B illustrates side view of a section of the mobile drive unit shown in FIG. 1A.
Figure 2C:
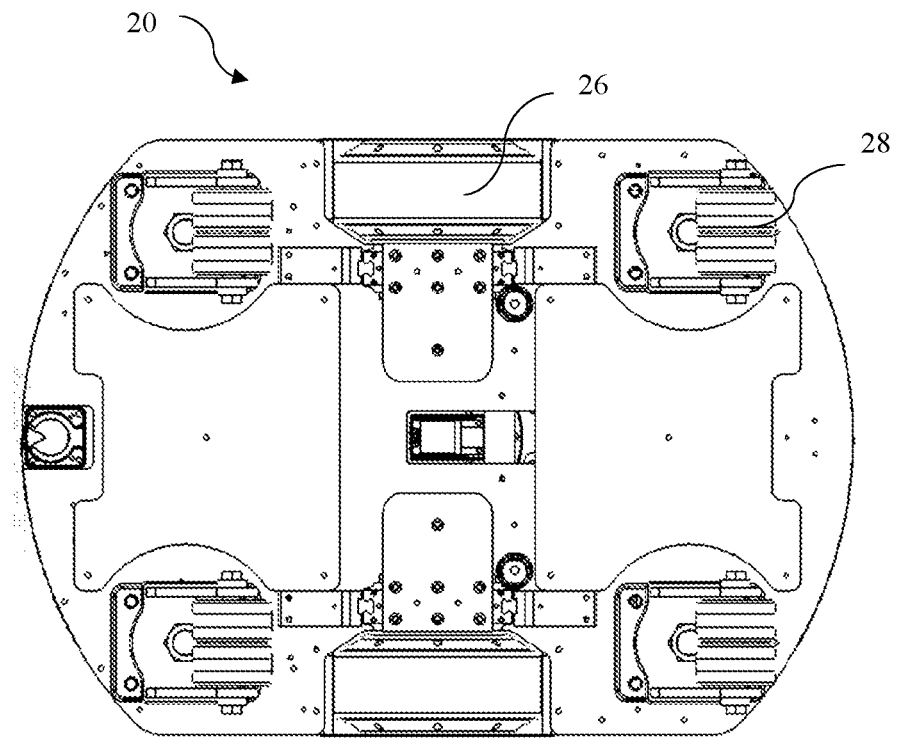
FIG. 2C illustrates bottom view of a section of the mobile drive unit shown in FIG. 1A.
Figure 3:
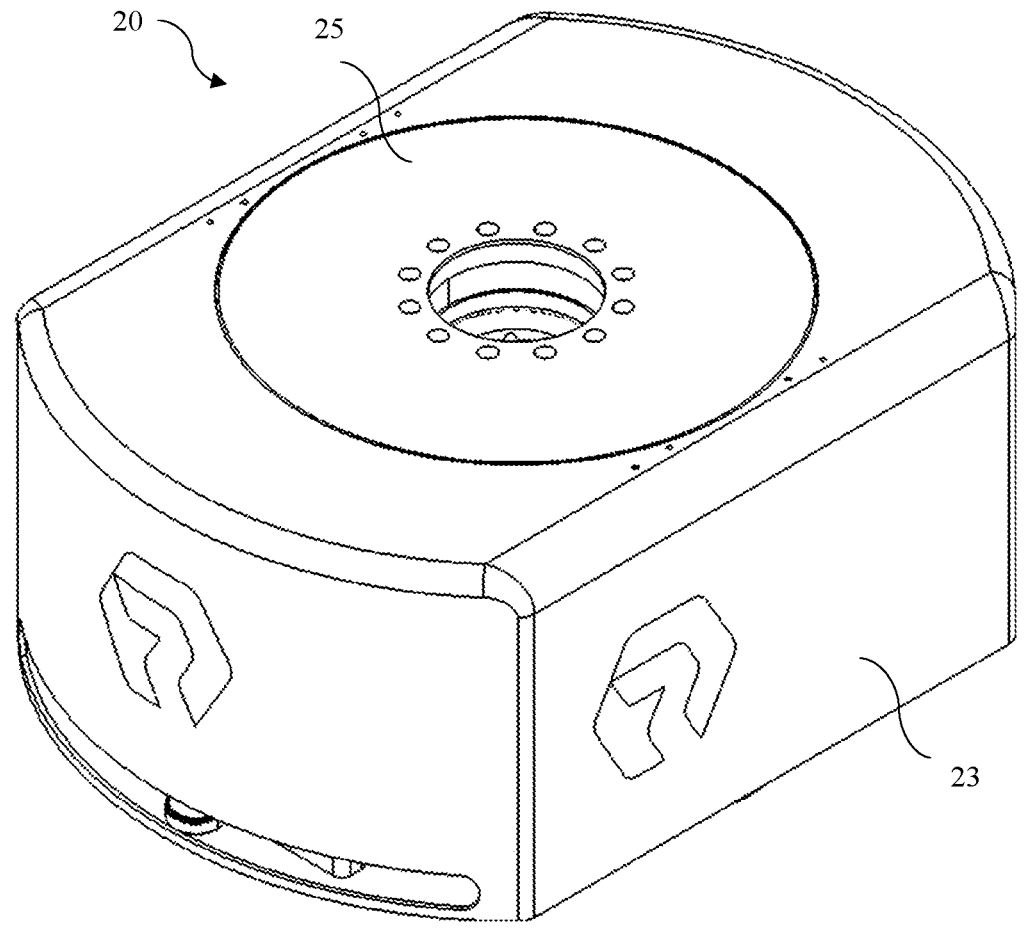
FIG. 3 illustrates perspective view of the entire mobile drive unit encased in a housing, according to an embodiment of the present disclosure.

FIG. 2A, FIG. 2B, FIG. 2C, and FIG. 3 illustrate several views of the mobile drive unit (20) in accordance with some embodiments of the present disclosure. FIG. 2A, FIG. 2B, and FIG. 2C illustrate perspective view, side view and bottom view respectively of the interior of the mobile drive unit (20), while FIG. 3 illustrates a perspective view of the mobile drive unit (20) encased within a housing (23). The mobile drive unit (20) may have a body (24) having a base of mobile drive unit (21) on which several components may be mounted and supported. The components may include electronic circuitry (22) necessary to perform the transportation activities within the facility (30). The electronic circuitry may include a power source such as a battery, an inverter, power transmission lines, signal processing elements, sensors, drive devices, a control unit associated with a memory unit, processor, regulation devices, communication devices, and several other components. The above components are not illustrated or described for the sake of simplicity. The mobile drive unit (20) may have a plurality of drive wheels (28) [best shown in FIG. 2B and FIG. 2C] which are propelled based on instructions to transport the inventory holders (10). The mobile drive unit (20) also has a docking head (25) which may firmly engage or couple with the base (11) or any other engageable portion of the inventory holder (10). Optionally, the mobile drive unit (20) may be provided with an elevating mechanism (26) coupled to a drive device, for example, an actuator to actuate and couple the docketing head (25) with the inventory holder (10).

Figure 4A:
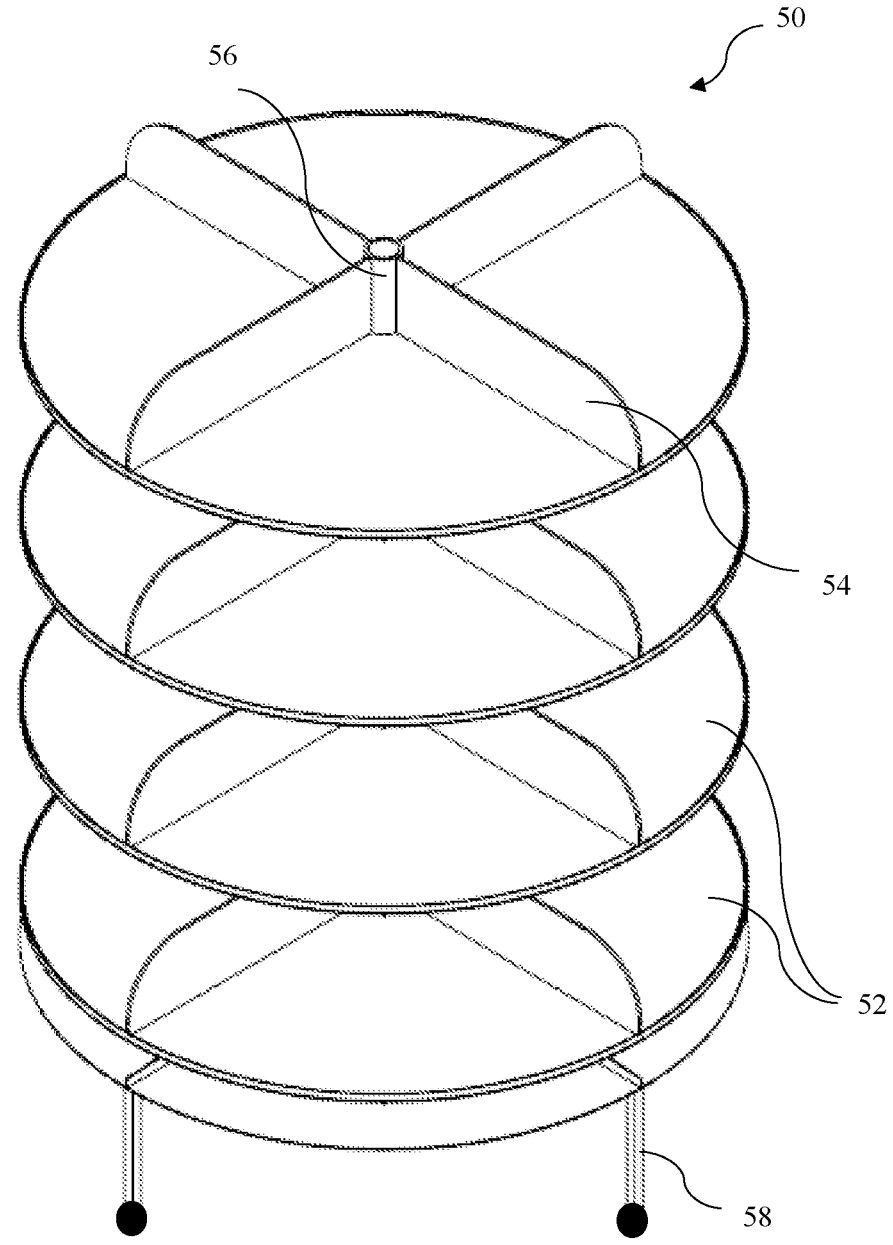
FIG. 4A illustrate perspective view of an inventory holder having circular compartments for storing inventory items, according to an embodiment of the disclosure.
Figure 4B:
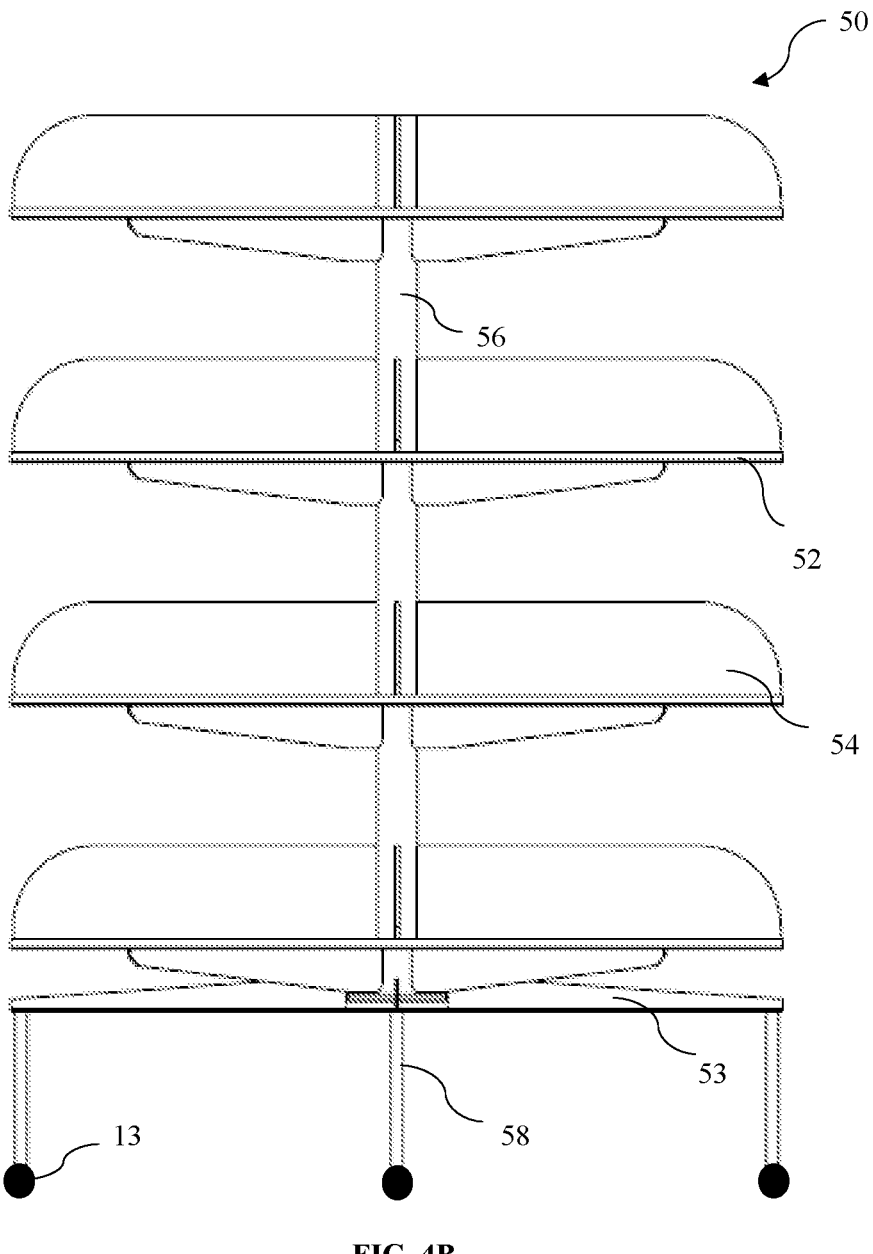
FIG. 4B illustrates front view of the inventory holder having circular compartments for storing inventory items, according to an embodiment of the disclosure.
Figure 5:
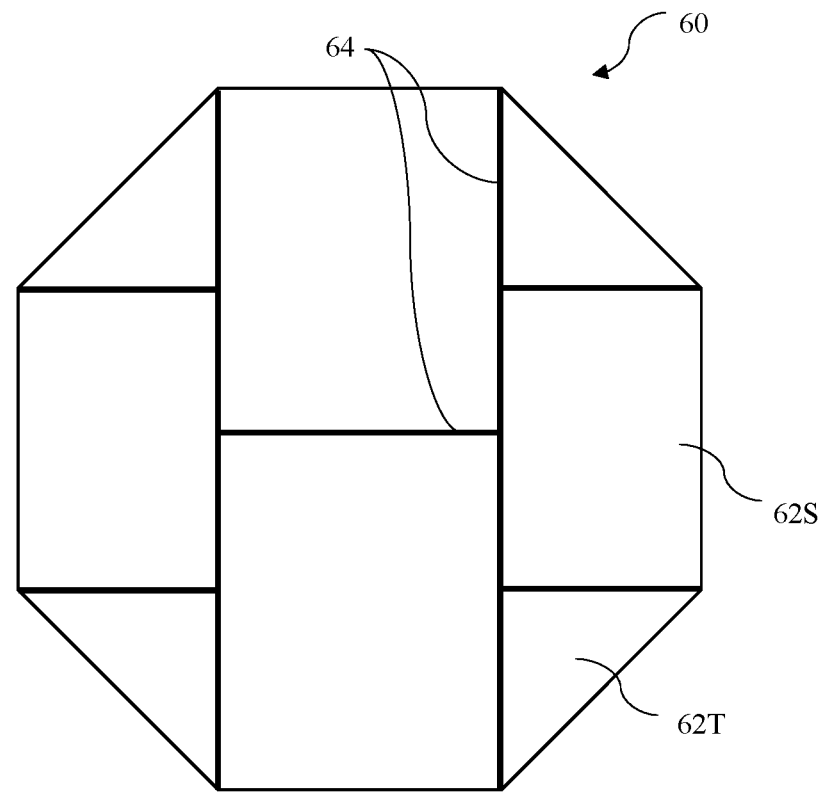
FIG. 5 illustrates a top view of an octagonal shaped compartment employed in the inventory holder for storing the inventory items, according to an embodiment of the present disclosure.

FIG. 4A and FIG. 4B illustrate perspective view and front view respectively of an inventory holder (50) in accordance with some embodiments of the present disclosure. The inventory holder (50) disclosed in embodiments of the present disclosure may have a circular configuration as shown. The circular configuration may be attained by coupling a plurality of circular compartments [or shelves] (52) to a central shaft (56) with the shaft (56) being rotatable by applying force. The force may be applied manually by the personnel located in a given workstation, or the shaft (56) may be driven autonomously by a drive unit [not shown] depending on requirement. In an embodiment, each circular compartment (52) has a diameter limited to 1950 mm or 1.95 m. In order to access the items (16) stored in the circular compartment (52), the shaft (56) may be rotated through a given angle by the personnel. In an embodiment, each circular compartment (52) may be divided into two or more sectors by at least one partition (54) as shown in FIG. 4A. The partitions (54) ensure that the items (16) are stored within the compartments in an organized manner so that the time involved in rotating and accessing a particular item is as least as possible. The partitions (54) also ensure that the maximum distance an item (16) can be located is less than the midpoint or center from the outer periphery i.e., <975 mm or 0.975 m, so that the item is easily accessible by the personnel by rotation. In an embodiment, the circular compartment (52) may be divided into a combination of square/rectangular and triangular sectors by different orientations of the partitions (54). Such a configuration minimizes the number of sharp corners, for example, formed by intersection of two sides of a triangle which cannot accommodate medium and large sized inventory items. In an embodiment, the circular inventory holder (50) is supported by legs (58) equipped with wheels (13) for navigating the inventory holder (50) in the facility (30). The wheels (13) may also assist in reducing the effort required to move the inventory holder (50), and in customizing the height, width and volume of the inventory holder (50) based on space constraints and infrastructure of the facility (30). In another embodiment, the compartments (52) need to be limited to circular geometry, rather may have other geometrical shapes like square, rectangular, and so on, or a combination of one or more of these may be employed. In another embodiment, the geometrical shape of each of the plurality of compartments (52) and one or more sectors in each of the plurality of compartments (52) is selected based on shape, size or any other physical characteristics of the inventory items being stored. FIG. 5 illustrates a yet another geometrical configuration of the compartment (60) having 8 edges [although any number of edges or any polygonal configuration may be used]. As shown in FIG. 5, the partitions (64) may be arranged so as to result in a number of square/rectangular (62S) and triangular (62T) sector combinations, or any other geometrical shapes and their combinations thereof. Like the circular compartments (52), the polygonal compartment (60) of FIG. 5 also minimizes the number of sharp corners, for example, formed by intersection of two sides of a triangle which cannot accommodate medium and large sized inventory items.

Figure 6A:
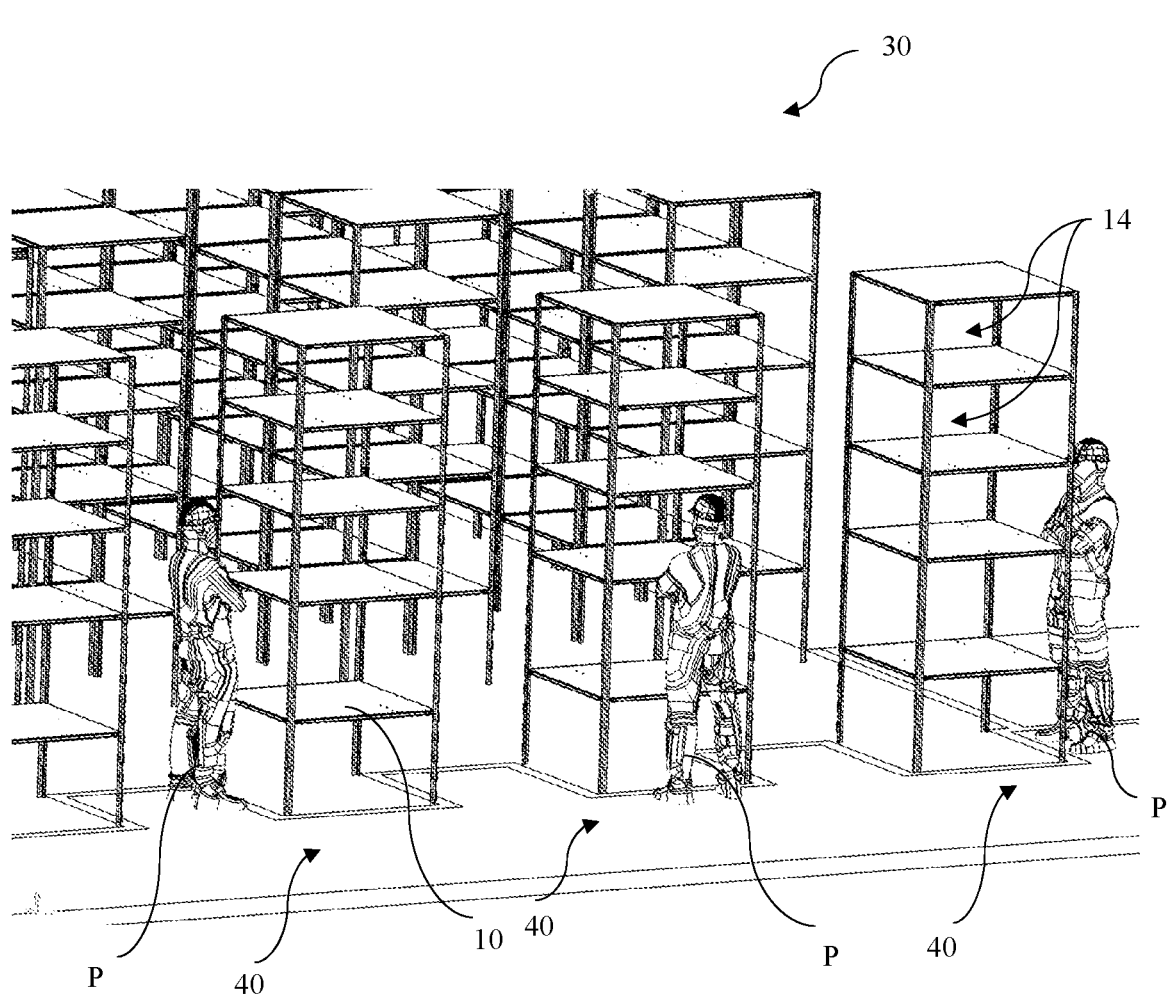
FIG. 6A illustrates schematic perspective view of a facility in which the inventory holders are positioned so as to be accessible from three different directions/sides, according to an embodiment of the present disclosure.
Figure 6B:
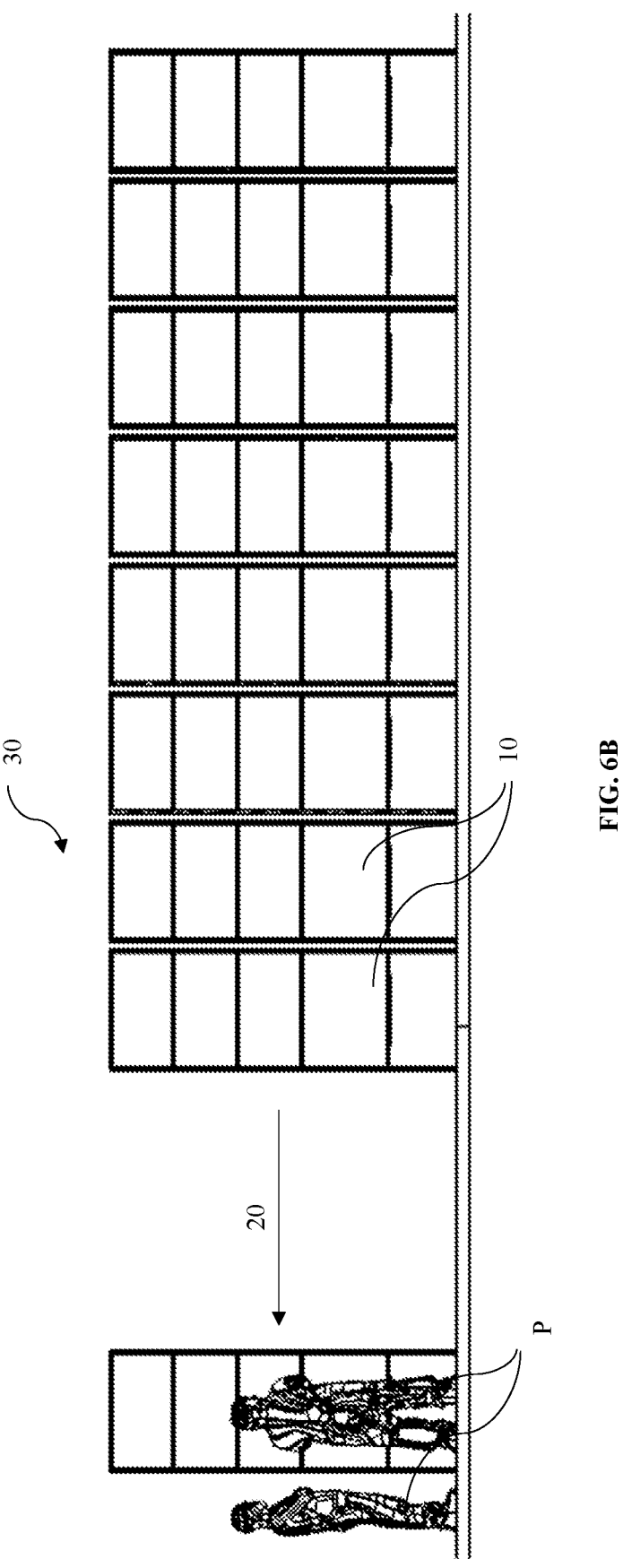
FIG. 6B illustrates schematic front view of a facility in which the inventory holders are positioned so as to be accessible from three different directions/sides, according to an embodiment of the present disclosure.
Figure 6C:
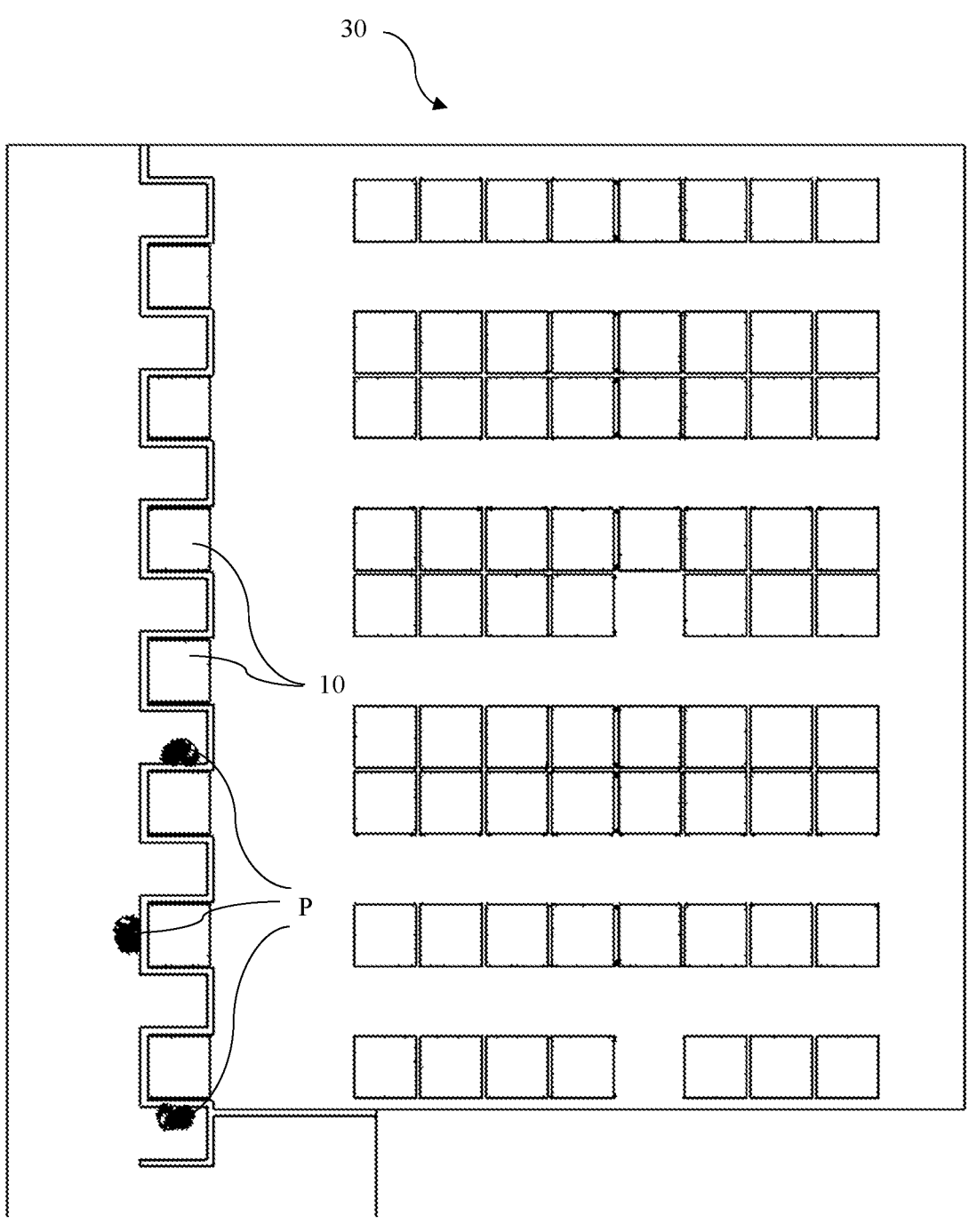
FIG. 6C illustrates schematic top view of a facility in which the inventory holders are positioned so as to be accessible from three different directions/sides, according to an embodiment of the present disclosure.

FIG. 6A, FIG. 6B, and FIG. 6C illustrate schematic perspective view, front view, and top view respectively of a facility in which the inventory holders (10) are positioned so as to be accessible from three different directions/sides, according to an embodiment of the present disclosure. According to this embodiment, the inventory holders (10) having square or rectangular or any other shaped compartments may be transported to different stations (40) by the mobile drive unit (20) [indicated by arrow in FIG. 6B]. The stations (40) are spaced apart such that when each inventory holder (10) is placed in or near the respective station (40), a person (P) may access the inventory holder (10) from three different sides or directions. The three distinct directions from which the person (P) may access the inventory items (16) [not shown in FIG. 6A and FIG. 6C] is clearly depicted in FIG. 6A and FIG. 6C. By this configuration, even with larger dimensions of the shelves/compartments (14), the inventory items (16) may be easily reached.

Figure 7:
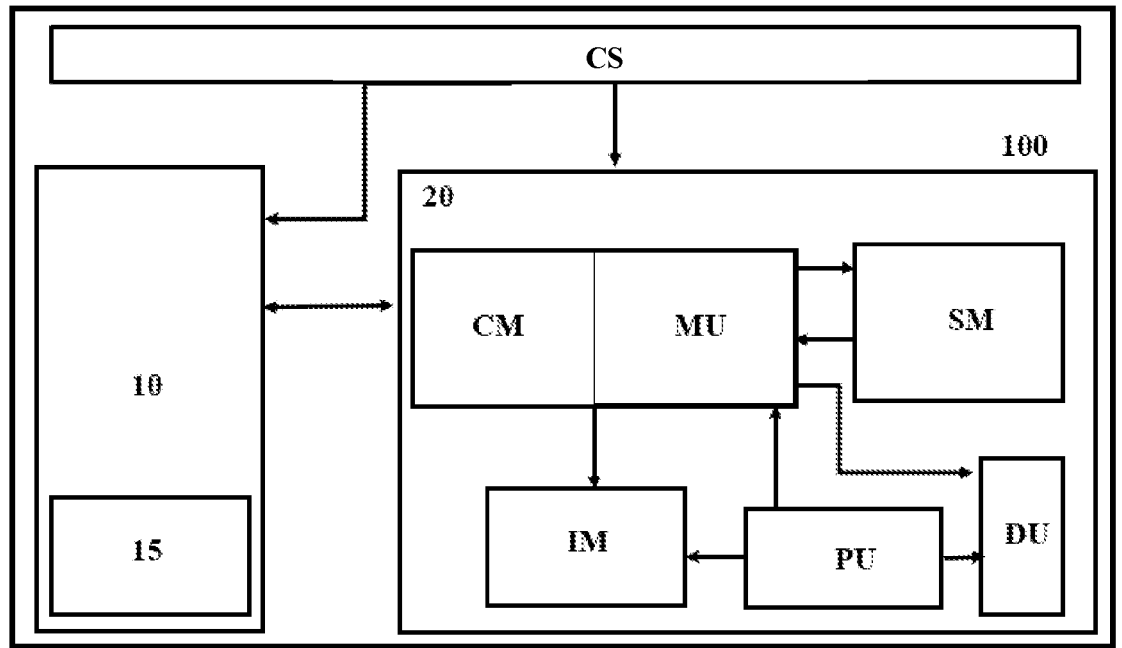
FIG. 7 illustrates a block diagram depicting the control architecture of the system in the fulfillment center, according to some embodiments of the present disclosure.

FIG. 7 illustrates an exemplary block diagram depicting the control architecture of the system (100) in the fulfillment center, according to some embodiments of the present disclosure. A control module (CM) present in the mobile drive unit (20) may be associated with the control and coordination of the mobile drive unit (20), as shown in FIG. 7. The control module (CM) may be configured to navigate the mobile drive unit (20) inside the facility (30) through a sequence of operations, which is described below. The control module (CM) may receive data in various forms corresponding to operations of the mobile drive unit (20) in the facility (30). For example, the control module (CM) may receive coordinate data corresponding to coordinates or points along which the mobile drive unit (20) needs to be navigated. The control module (CM) may be interfaced with communication devices [not shown] to receive such data from a centralized server (CS) in the facility (30). The centralized server (CS) may also be communicatively linked with the inventory holder (10), for example, by a sensor or an RFID so that the whereabouts of a particular inventory holder (10) in the facility (30) may always be kept in track. The control module (CM) may be associated with a memory unit (MU) whose purpose will not be explained in detail.

Further, a sensor module (SM) may be operatively associated with the control module (CM) in a bi-directional manner. Various sensors including but not limited to proximity sensors, visual sensors, tactile sensors, thermal sensors constituting the sensor module (SM) may take part in providing feedback regarding surrounding conditions in order to accurately manoeuvre the mobile drive unit (20). The control module (CM) may also operate an indication module (IM) which may indicate physical status of the mobile drive unit (20), for example, providing indication of an approaching mobile drive unit (20) by sound or light signals and so on. A power unit (PU) present in the mobile drive unit (20) may supply power for operation of all the modules like CM, SM, IM, MU as well as the drive unit (DU). The drive unit (DU) takes part in providing drive power to the drive wheels (28) of the mobile drive unit (20). Upon receiving the data, the control module (CM) may determine an optimized route to navigate the mobile drive unit (20) in the facility. Once the optimized route is determined, the control module (CM) may actuate the drive unit (DU) to couple or dock or anchor the docketing head (25) of the mobile drive unit (20) with the inventory holder (10). This may be followed by maneuvering the mobile drive unit (20) to the intended site, for example, a station, along with the inventory holder (10). Once the mobile drive unit (20) reaches the intended site, the control module (CM) may determine the placement location of the inventory holder (10). The control module (CM) may determine the placement location of the inventory holder (10) based on the signals received from the sensor module (SM) and/or signals received from the centralized server (CS).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or system is described herein, it will be readily apparent that more than one device/system (whether or not they cooperate) may be used in place of a single device/system. Similarly, where more than one device or system is described herein (whether or not they cooperate), it will be readily apparent that a single device/system may be used in place of the more than one device or system, or a different number of devices/systems may be used instead of the shown number of devices or systems. The functionality and/or the features of the device or the system may be alternatively embodied by one or more other devices or systems which are not explicitly described as having such functionality/features. Thus, other embodiments of the invention need not include the device or the system itself.

Finally, the language used in the specification has been principally selected for readability and instructional purposes, and it may not have been selected to delineate or circumscribe the inventive subject matter. It is therefore intended that the scope of the invention be limited not by this description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting.

REFERENCE NUMERALS:

| Reference number | Description |
| --- | --- |
| 100 | System for fulfilling an order |
| 10 | Inventory holder/Rack |
| 10L | Loaded inventory holder |
| 10Q | Queued inventory holder |
| 11 | Base of the inventory holder |
| 13 | Wheels |
| 14 | Compartments/shelves |
| 15 | Cold storage unit/Refrigeration unit |
| 16 | Inventory items |
| 20 | Mobile drive unit |
| 21 | Base of mobile drive unit |
| 22 | Electronic circuitry |
| 23 | Housing of mobile drive unit |
| 24 | Body of mobile drive unit |
| 25 | Docking head |
| 26 | Elevating mechanism |
| 28 | Drive wheels of mobile drive unit |
| 30 | Facility |
| 32 | Conveyer |
| DZ | Drop zones |
| 'A' and 'B' | Points |
| SA | Storage area |
| OB | Outbound |
| 40 | Workstation, Station, picking station |
| PB | Picking bag/basket/box/carton |
| P | Personnel/persons in the station |
| X and Y | Picking stations |
| 50 | Circular inventory holder |
| 52 | Circular compartments |
| 54, 64 | Partitions |
| 56 | Central shaft |
| 58 | Legs |
| 60 | Polygonal compartment |
| 62S and 62T | Rectangular/square and triangular sectors |
| CM | Control module |
| SM | Sensor module |
| IM | Indication module |
| DU | Drive unit |
| MU | Memory Unit |
| PU | Power Unit |
| CS | Centralized server |
| NRFC | Nano Robotic Fulfillment Center |
| RDS | Robotic dark store |

We claim:

1. A system for fulfilling an order in a facility, the system comprising:
   a plurality of inventory holders being adapted to receive and store a plurality of inventory items, wherein each of the plurality of inventory holders includes one or more wheels to support the plurality of inventory holders;
   a plurality of compartments defined in each of the plurality of inventory holders, the plurality of compartments being supported by a central shaft; and
   a mobile drive unit configured to transport the plurality of inventory holders to one or more workstations in the facility, wherein the mobile drive unit comprises a plurality of drive wheels distinct from the one or more wheels of each of the plurality of inventory holders.

2. The system as claimed in claim 1, wherein the plurality of compartments are at least one of circular-shaped, square shaped, and other polygon-shaped.

3. The system as claimed in claim 2, wherein at least one of the plurality of compartments includes partitions that divide the compartment into sectors.

4. The system as claimed in claim 1, wherein physical characteristics including height and width of the inventory holders are selectively adjustable.

5. The system as claimed in claim 1, wherein the facility is at least one of a NRFC (Nano Robotic Fulfillment Center), a RDS (Robotic Dark Store), a warehouse, a commercial space, a parking space, a space intended for utility, or a vacant space.

6. The system as claimed in claim 1, wherein each of the plurality of inventory holders is a rack.

7. The system as claimed in claim 1, wherein each of the plurality of compartments of the inventory holders is separated in a vertical direction by a predetermined distance from an adjacent compartment, and wherein at least one of the plurality of compartments is divided in a horizontal direction into more than one sub-compartment.

8. The system as claimed in claim 1, wherein a compartment of the plurality of compartments accommodates a cold storage unit, the cold storage unit being adaptable to be transported along with its power source.

9. The system as claimed in claim 1, comprising a conveyer for transportation of the inventory items from at least one of an NRFC (Nano Robotic Fulfillment Center) or a RDS (Robotic Dark Store) to a pick-up location through a pick-up deck.

10. The system as claimed in claim 1, wherein the mobile drive unit is a robotic transport unit, the mobile drive unit comprising:
   a housing configured to encase the mobile drive unit;
   an electronic circuitry configured to operate the mobile drive unit;
   a docking head configured to support and transport the inventory holders; and
   an elevating mechanism actuatable to raise and lower the docking head to engage and disengage the docking head with the inventory holders.

11. A method for fulfilling an order in a facility, comprising:
   docking at least one of a plurality of inventory holders with a plurality of inventory items using a mobile drive unit, wherein the plurality of inventory holders comprise wheels;
   transporting the plurality of inventory holders to at least one workstation in the facility by the mobile drive unit using drive wheels of the mobile drive unit, wherein the drive wheels are distinct from the wheels of the plurality of inventory holders; and
   transporting processed inventory items from a fulfilment center to a pick-up location through at least one of a pigeonhole rack, and a pick-up deck using a conveyer.

12. The method as claimed in claim 11 further comprising determining placement of each of the plurality of inventory items in the plurality of inventory holders based on data from a sales history.

13. The method as claimed in claim 11 further comprising determining placement of each of the plurality of inventory holders proximal to each drop zone in the facility based on data from a sales history.

* * * * *